(12) United States Patent
Tada et al.

(10) Patent No.: US 11,274,832 B2
(45) Date of Patent: Mar. 15, 2022

(54) FUEL INJECTOR, COMBUSTOR, AND GAS TURBINE

(71) Applicant: Mitsubishi Hitachi Power Systems, Ltd., Kanagawa (JP)

(72) Inventors: Katsuyoshi Tada, Tokyo (JP); Keijiro Saito, Tokyo (JP); Satoshi Tanimura, Yokohama (JP); Kenta Taniguchi, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 0 days.

(21) Appl. No.: 16/767,359

(22) PCT Filed: Nov. 27, 2018

(86) PCT No.: PCT/JP2018/043634
§ 371 (c)(1),
(2) Date: May 27, 2020

(87) PCT Pub. No.: WO2019/107369
PCT Pub. Date: Jun. 6, 2019

(65) Prior Publication Data
US 2020/0386164 A1 Dec. 10, 2020

(30) Foreign Application Priority Data
Nov. 30, 2017 (JP) .............................. JP2017-231143

(51) Int. Cl.
*F23R 3/28* (2006.01)
*F02C 7/18* (2006.01)
*F02C 7/22* (2006.01)

(52) U.S. Cl.
CPC ................ *F23R 3/286* (2013.01); *F02C 7/18* (2013.01); *F23R 3/283* (2013.01); *F02C 7/22* (2013.01); *F23R 2900/03282* (2013.01)

(58) Field of Classification Search
CPC .... F23R 3/28; F23R 3/34; F23R 3/343; F23R 3/346; F23R 3/283; F23R 3/286;
(Continued)

(56) References Cited

U.S. PATENT DOCUMENTS 8,112,999 B2   2/2012   Zuo
8,438,851 B1   5/2013   Uhm et al.
(Continued)

FOREIGN PATENT DOCUMENTS

JP   60-82724      5/1985
JP   2010-101309   5/2010
(Continued)

OTHER PUBLICATIONS

International Search Report dated Feb. 12, 2019 in corresponding International (PCT) Application No. PCT/JP2018/043634, with English Translation.
(Continued)

*Primary Examiner* — William H Rodriguez
(74) *Attorney, Agent, or Firm* — Wenderoth, Lind & Ponack, L.L.P.

(57) ABSTRACT

The present invention is a downstream plate which is provided on a downstream side of an upstream plate includes an air inlet into which cooling air is introduced from a cooling air introduction pipe and a cooling flow path which extends in a direction along a surface of the downstream plate from the air inlet so as to avoid a premix tube and through which cooling air flows.

6 Claims, 8 Drawing Sheets

(58) Field of Classification Search
CPC .......... F23D 14/62; F23D 14/64; F23D 11/40; F02C 7/222
See application file for complete search history.

(56) References Cited

U.S. PATENT DOCUMENTS

| | | | |
|---|---|---|---|
| 8,801,428 B2* | 8/2014 | Melton | F23R 3/46 431/2 |
| 8,955,327 B2 | 2/2015 | Barker et al. | |
| 9,121,612 B2* | 9/2015 | Uhm | F23R 3/54 |
| 9,322,557 B2* | 4/2016 | Uhm | F23R 3/286 |
| 9,341,376 B2* | 5/2016 | Westmoreland, III | F23R 3/286 |
| 9,353,950 B2* | 5/2016 | Uhm | F23R 3/10 |
| 9,423,135 B2* | 8/2016 | Hughes | F23R 3/10 |
| 9,574,533 B2* | 2/2017 | Monaghan | F02M 55/008 |
| 2010/0031662 A1 | 2/2010 | Zuo | |
| 2010/0101229 A1 | 4/2010 | York et al. | |
| 2011/0016866 A1 | 1/2011 | Boardman et al. | |
| 2011/0073684 A1 | 3/2011 | Johnson et al. | |
| 2013/0104552 A1* | 5/2013 | Uhm | F23M 20/005 60/738 |
| 2013/0318977 A1* | 12/2013 | Berry | F23R 3/286 60/739 |
| 2014/0116066 A1 | 5/2014 | Melton et al. | |
| 2015/0076251 A1 | 3/2015 | Berry | |
| 2015/0165568 A1* | 6/2015 | Means | B23P 6/005 29/402.06 |
| 2016/0018109 A1 | 1/2016 | Beck et al. | |
| 2016/0033133 A1* | 2/2016 | Johnson | F23R 3/286 60/737 |
| 2016/0102863 A1 | 4/2016 | Yoshino | |
| 2018/0051632 A1* | 2/2018 | Word | F23R 3/286 |
| 2019/0360697 A1* | 11/2019 | Tada | F23D 14/62 |
| 2021/0102703 A1* | 4/2021 | Tada | F23R 3/283 |

FOREIGN PATENT DOCUMENTS

| | | |
|---|---|---|
| JP | 2011-27402 | 2/2011 |
| JP | 2011-69602 | 4/2011 |
| JP | 2013-139993 | 7/2013 |
| JP | 2013-250046 | 12/2013 |
| JP | 2014-88874 | 5/2014 |
| JP | 2016-80214 | 5/2016 |

OTHER PUBLICATIONS

Written Opinion dated Feb. 12, 2019 in corresponding International (PCT) Application No. PCT/JP2018/043634, with English Translation.

* cited by examiner

FUEL INJECTOR, COMBUSTOR, AND GAS TURBINE

TECHNICAL FIELD

The present invention relates to a fuel injector, a combustor, and a gas turbine.

Priority is claimed on Japanese Patent Application No. 2017-231143, filed Nov. 30, 2017, the content of which is incorporated herein by reference.

BACKGROUND ART

A combustor of a gas turbine includes a fuel injector. The fuel injector uniformly mixes compressed air and a fuel gas in advance. Then, the combustor generates a high-temperature combustion gas.

As the combustor of the gas turbine, a combustor that stabilizes combustion and emits a small amount of CO/NOx which are substances of environmental concern is preferable.

As such a combustor, a combustor equipped with a perforated jet burner (also referred to as a "cluster burner") is known (for example, see Japanese Unexamined Patent Application, First Publication No. 2016-80214)

Japanese Unexamined Patent Application, First Publication No. 2016-80214 discloses a fuel injector including an upstream plate disposed on an upstream side and provided with a plurality of air holes, a downstream plate disposed on a downstream side of the upstream plate and provided with a plurality of air holes, and a fuel supply tube

SUMMARY OF INVENTION

Technical Problem

Incidentally, in the fuel injector described in Japanese Unexamined Patent Application, First Publication No. 2016-80214, there is a possibility that an attached flame may occur on the downstream plate. For this reason, the downstream plate needs to be cooled. Thus, it is preferable to efficiently cool the downstream plate.

Here, an object of the present invention is to provide a fuel injector, a combustor, and a gas turbine capable of efficiently cooling a downstream plate.

Solution to Problem

In order to solve the above-described problems, a fuel injector according to an aspect of the present invention includes: an upstream plate; a downstream plate which is installed on a downstream side of the upstream plate and is disposed so as to face the upstream plate; a cylindrical member which is formed like a cylinder having upstream and downstream opening ends, and in which a plenum is defined with the upstream plate disposed at the upstream opening end and the downstream plate disposed at the downstream opening end; a fuel tube which is configured to introduce a fuel gas into the plenum; a premix tube which is formed like a tube having upstream and downstream opening ends and extending so as to pass through the upstream plate and the downstream plate and the plenum, and in which a fuel hole introducing the fuel gas supplied into the plenum is formed, wherein the fuel gas is to mixed with air introduced from the upstream opening end in the premix tube; and a cooling air introduction pipe which is configured to introduce cooling air into the downstream plate, wherein the downstream plate includes an air inlet into which the cooling air is introduced from the cooling air introduction pipe and a cooling flow path which extends in a direction along a surface of the downstream plate from the air inlet so as to avoid the premix tube.

According to the present invention, since the cooling flow path through which the cooling air flows is provided in the downstream plate having a high temperature, the downstream plate can be directly cooled with the cooling air. Accordingly, it is possible to efficiently cool the downstream plate by using a small amount of the cooling air compared to a case in which the cooling air is blown out from the outside of the downstream plate.

Further, since the downstream plate is provided with the air inlet into which the cooling air is introduced from the cooling air introduction pipe, the plenum for the cooling air does not need to be provided and only the plenum for the fuel gas may be provided. Accordingly, the structure of the fuel injector can be simplified.

Further, in the fuel injector according to an aspect of the present invention, the downstream plate may include: a first plate portion which has a first surface facing the upstream plate; and a second plate portion which is disposed on an upstream side of the first plate portion and which includes a second surface bonded to the first surface, and the cooling flow path.

In this way, since the cooling flow path is formed in the second plate portion disposed on the upstream side of the first plate portion instead of the first plate portion in which an attached flume may be formed, it is possible to reduce the thickness of the first plate portion which tends to be hotter than the second plate portion.

Accordingly, it is possible to efficiently cool the first plate portion having a thin thickness by using the cooling air flowing through the cooling flow path.

Further, in the fuel injector according to an aspect of the present invention, the cooling flow path may be formed like a groove which is recessed from the second surface toward the upstream plate side.

With such a configuration, since apart of the cooling air flowing through the cooling flow path can be directly brought into contact with the first surface of the first plate portion, the first plate portion can be efficiently cooled compared to a case in which the cooling flow path is embedded in the second plate portion.

Further, in the fuel injector according to an aspect of the present invention, the first plate portion may include a through-hole which passes through a portion facing the groove.

With the through-hole having such a configuration, since it is possible to cool the first plate portion from the inside of the first plate portion by the cooling air flowing through the through-hole and to cool the surface of the first plate disposed on the side opposite to the first surface by the cooling air ejected from the through-hole, the first plate portion can be cooled very efficiently.

Further, in the fuel injector according to an aspect of the present invention, the cylindrical member may include a discharge path through which the cooling air, has passed through the downstream plate, is discharged toward an upstream side in relation to the upstream plate.

With the discharge path having such a configuration, the cooling air discharged from the discharge path can be used again as air introduced into the premix tube.

In order to solve the above-described problems, a combustor according to an aspect of the present invention includes: the above-described fuel injector; and a transition piece in which the fuel injector is accommodated and is configured to generate a combustion gas by burning a gas in which air is mixed with a fuel gas injected from the fuel injector.

According to the present invention, since the fuel injector is provided, the downstream plate can be efficiently cooled and the combustor can be stably operated.

In order to solve the above-described problems, a gas turbine according to an aspect of the present invention includes: the above-described combustor; a compressor which is configured to generate compressed air and supply the compressed air to the fuel injector; an extraction unit which is configured to extract the compressed air generated by the compressor; a forced air-cooled compressor which is configured to further compress the compressed air extracted by the extraction unit and generates cooling air; and a cooling air introduction line which is configured to introduce the cooling air generated by the forced air-cooled compressor to the combustor.

According to the present invention, since the combustor is provided, the downstream plate can be efficiently cooled and the gas turbine can be stably operated.

Further, since the forced air-cooled compressor is provided, the extracted compressed air can be further compressed by the extraction unit. Accordingly, cooling air having a pressure higher than the extracted compressed air can be supplied to the combustor.

Furthermore, since the forced air-cooled compressor is provided, the cross-sectional area of the cooling flow path can be decreased.

Further, the gas turbine according to an aspect of the present invention may further include a cooler which is configured to cool the compressed air extracted by the extraction unit.

With the cooler having such a configuration, the compressed air can be cooled. Accordingly, cooling air having a temperature lower than the extracted compressed air can be supplied to the combustor.

Advantageous Effects of Invention

According to the present invention, a downstream plate can be efficiently cooled.

DESCRIPTION OF EMBODIMENTS

Hereinafter, embodiments to which the present invention is applied will be described in detail with reference to the drawings.

Embodiments

Figure 1:
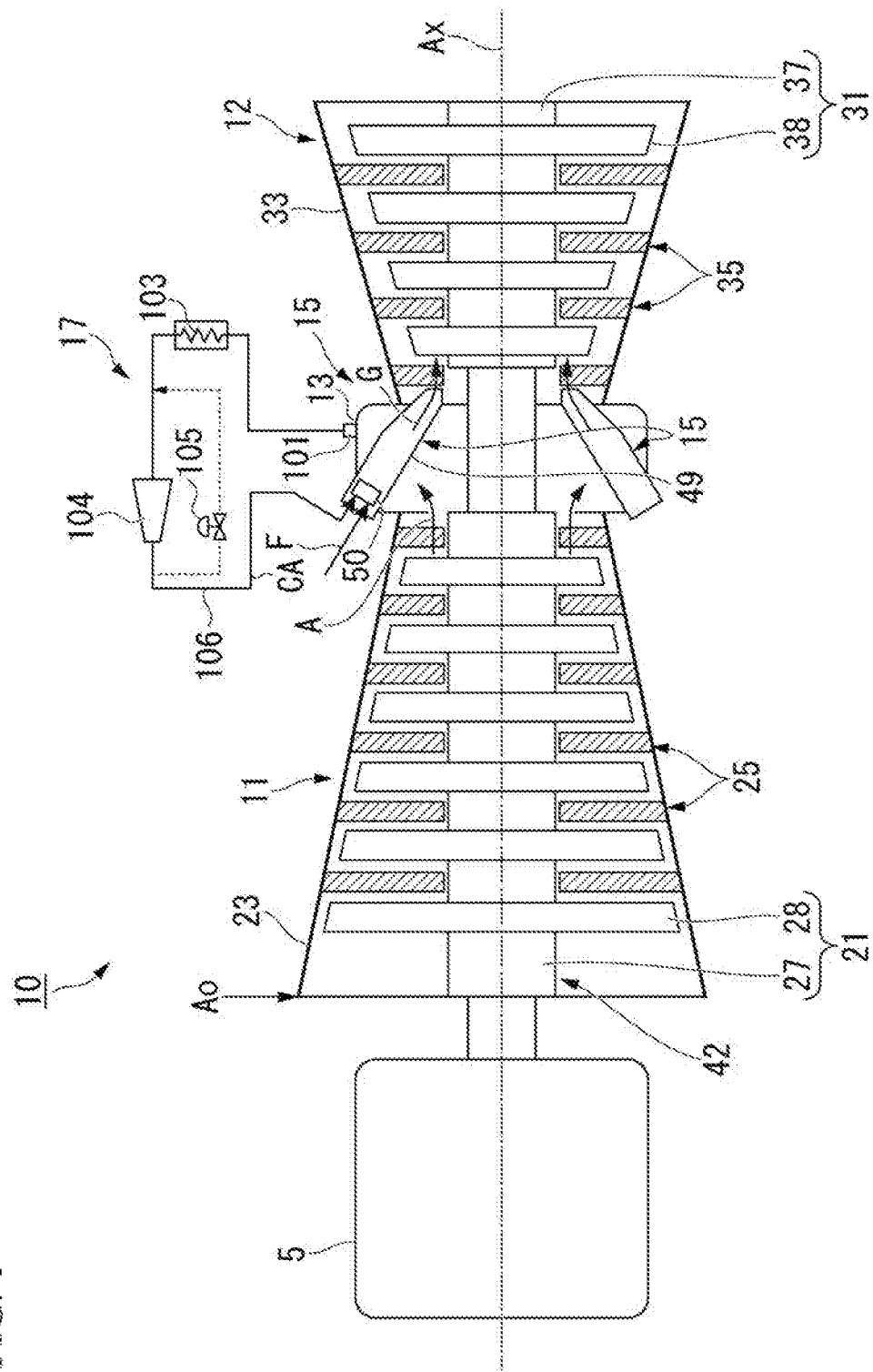
FIG. 1 is a diagram showing a schematic configuration of a gas turbine according to an embodiment of the present invention.

A gas turbine 10 of this embodiment will be described with reference to FIG. 1. FIG. 1 shows a generator 5 which is not a component of the gas turbine 10. FIG. 1 shows a compressor 11, a turbine 12, a middle casing 13, and a combustor 15 in cross-section for convenience of description.

Further, in FIG. 1, A indicates compressed air (hereinafter, referred to as "compressed air A"), Ao indicates outside air (hereinafter, referred to as "outside air Ao"), Ax indicates the axes of the compressor 11 and the turbine 12 (hereinafter, referred to as an "axis Ax"), CA indicates cooling air (hereinafter, referred to as "cooling air CA"), F indicates a fuel gas (hereinafter, referred to as a "fuel gas F"), and G indicates a combustion gas (hereinafter, referred to as a "combustion gas G").

The gas turbine 10 includes the compressor 11, the turbine 12, the middle casing 13, the plurality of combustors 15, and a cooling device 17.

The compressor 11 includes a compressor rotor 21, a compressor casing 23, and a plurality of compressor vane rows 25.

The compressor rotor 21 rotates around an axis Ax. The compressor rotor 21 includes a compressor rotor shaft 27 and a plurality of compressor blade rows 28.

The compressor rotor shaft 27 extends in the direction of the axis Ax and the axis matches the axis Ax.

The plurality of compressor blade rows 28 are provided in the outer peripheral surface of the compressor rotor shaft 27. The plurality of compressor blade rows 28 are arranged at intervals in the direction of the axis Ax.

The plurality of compressor blade rows 28 include a plurality of rotor blades arranged in the circumferential direction of the compressor rotor shaft 27.

The compressor 11 with the above-described configuration generates the compressed air A by allowing the outside air Ao (for example, air) taken from the outside to pass through a space formed between the plurality of compressor vane rows 25 and the compressor blade row 28 while the compressor rotor 21 rotates. The generated compressed air A is supplied into the middle casing 13.

The compressor casing 23 has a cylindrical shape and accommodates the compressor rotor 21.

The plurality of compressor vane rows 25 are fixed into the compressor casing 23. Each compressor vane row 25 is disposed on a downstream side of a compressor blade row 28. Each of the plurality of compressor vane rows 25 includes a plurality of stator blades arranged in the circumferential direction of the compressor casing 23.

The turbine 12 includes a turbine rotor 31, a turbine casing 33, and a plurality of turbine vane rows 35.

The turbine rotor 31 includes a turbine rotor shaft 37 and a plurality of turbine blade rows 38.

The turbine rotor shaft 37 extends in the direction of the axis Ax and rotates around the axis Ax. One end portion of the turbine rotor shaft 37 is connected to a rotor of the generator 5.

The plurality of turbine blade rows 38 are provided in the outer peripheral surface of the turbine rotor shaft 37. The plurality of turbine blade rows 38 are arranged at intervals in the direction of the axis Ax.

Each of the plurality of turbine blade rows 38 includes a plurality of rotor blades arranged in the circumferential direction of the turbine rotor shaft 37.

The turbine rotor 31 with the above-described configuration is connected to the above-described compressor rotor 21 in the direction of the axis Ax. Accordingly, the turbine rotor 31 and the compressor rotor 21 rotate together. The turbine rotor 31 and the compressor rotor 21 constitute the gas turbine rotor 42.

The turbine casing 33 has a cylindrical shape and accommodates the turbine rotor 31.

The plurality of turbine vane rows 35 are provided inside the turbine casing 33. The turbine vane row 35 is disposed on the upstream side of each turbine blade row 38.

Each of the plurality of turbine vane rows 35 includes a plurality of stator blades arranged in the circumferential direction of the turbine casing 33.

The combustion gas G which is generated by the combustor 15 to be described later is supplied to the turbine 12 having the above-described configuration. Then, when the combustion gas 0 passes through a space formed between the turbine vane row 35 and the turbine blade row 38, the turbine rotor shaft 37 is rotationally driven.

Accordingly, rotating power is applied to the generator 5 connected to the gas turbine rotor 42 so as to generate power.

The middle casing 13 is provided between the compressor casing 23 and the turbine casing 33. The middle casing 13 is a cylindrical member that extends in the direction of the axis Ax. An upstream end of the middle casing 13 in the direction of the axis Ax is connected to the compressor casing 23. A downstream end of the middle casing 13 in the direction of the axis Ax is connected to the turbine casing 33.

Next, the fuel injector 50 will be described with reference to FIGS. 1 to 6.

Figure 2:
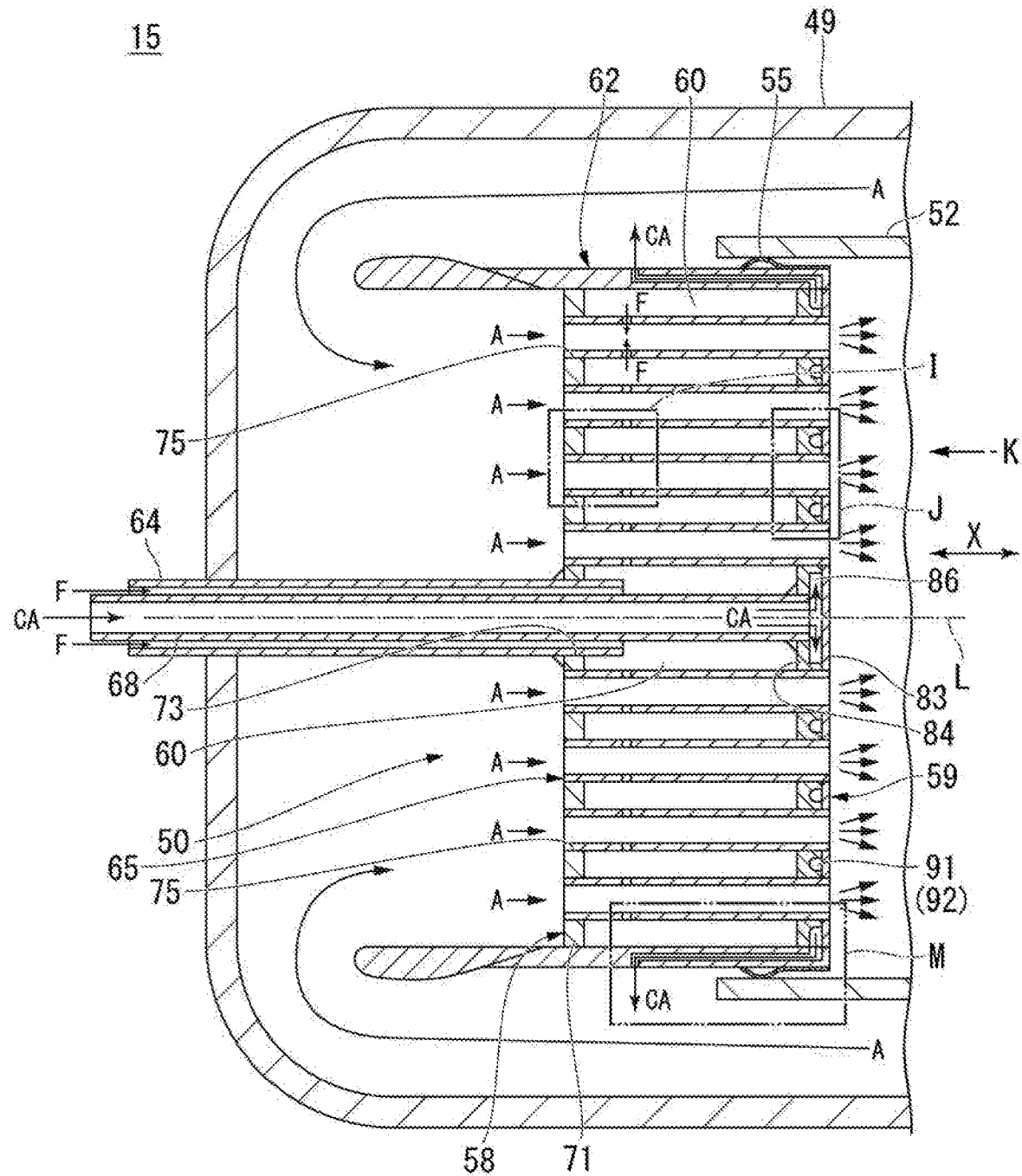
FIG. 2 is an enlarged cross-sectional view of a portion in which a fuel injector is disposed in a combustor shown in FIG. 1.

In FIG. 2, the same components as those of the structure shown in FIG. 1 will be indicated by the same reference numerals. Further, in FIG. 2, I, J, and M respectively indicate areas (hereinafter, referred to as an "area I", an "area J", and an "area M"), L indicates the center axis of the fuel injector 50 (hereinafter, referred to as a "center axis L"), and the X direction indicates the extension direction of the center axis L.

Further, in FIG. 2, an arrow attached to the vicinity of the downstream plate 59 schematically shows a state in which a gas obtained by mixing the compressed air A and the fuel gas F is ejected.

Figure 3:
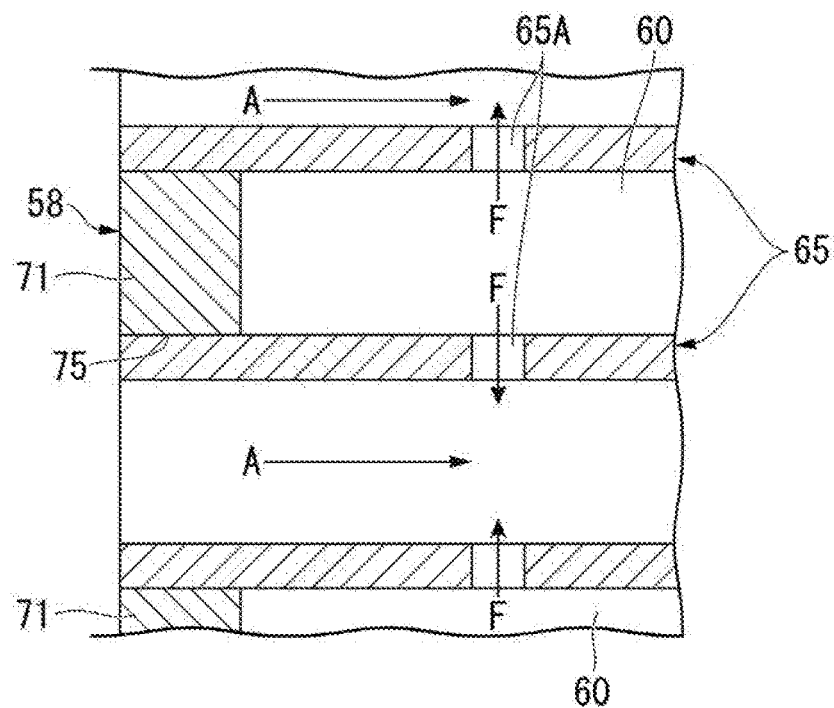
FIG. 3 is an enlarged cross-sectional view of a portion surrounded by an area I shown in FIG. 2.
Figure 4:
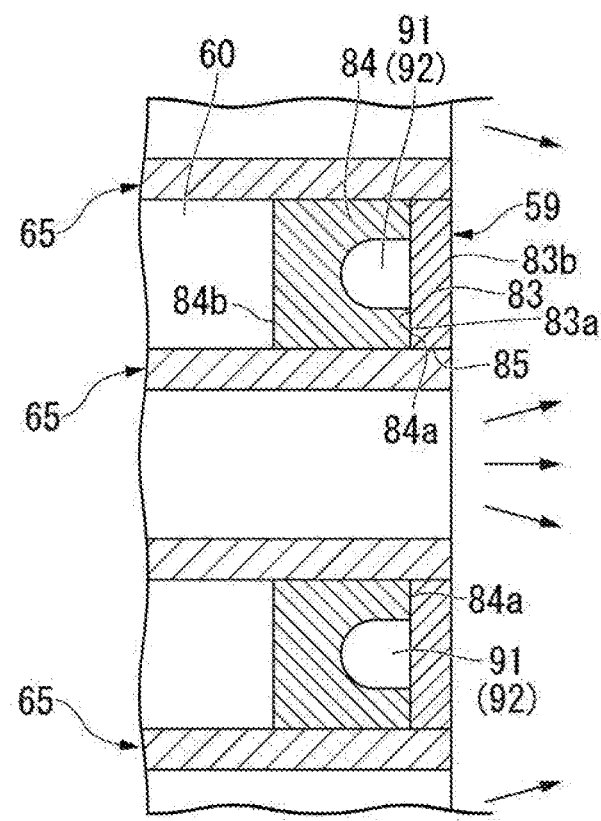
FIG. 4 is an enlarged cross-sectional view of a portion surrounded by an area J shown in FIG. 2.
Figure 5:
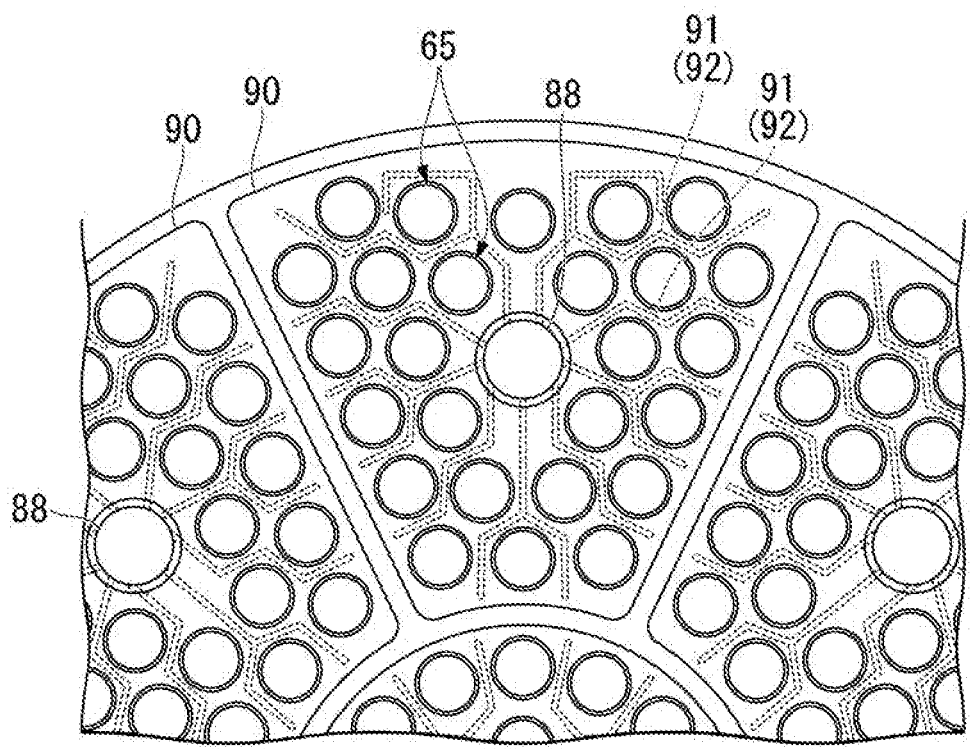
FIG. 5 is a diagram in which the fuel injector shown in FIG. 2 is viewed from K.
Figure 6:
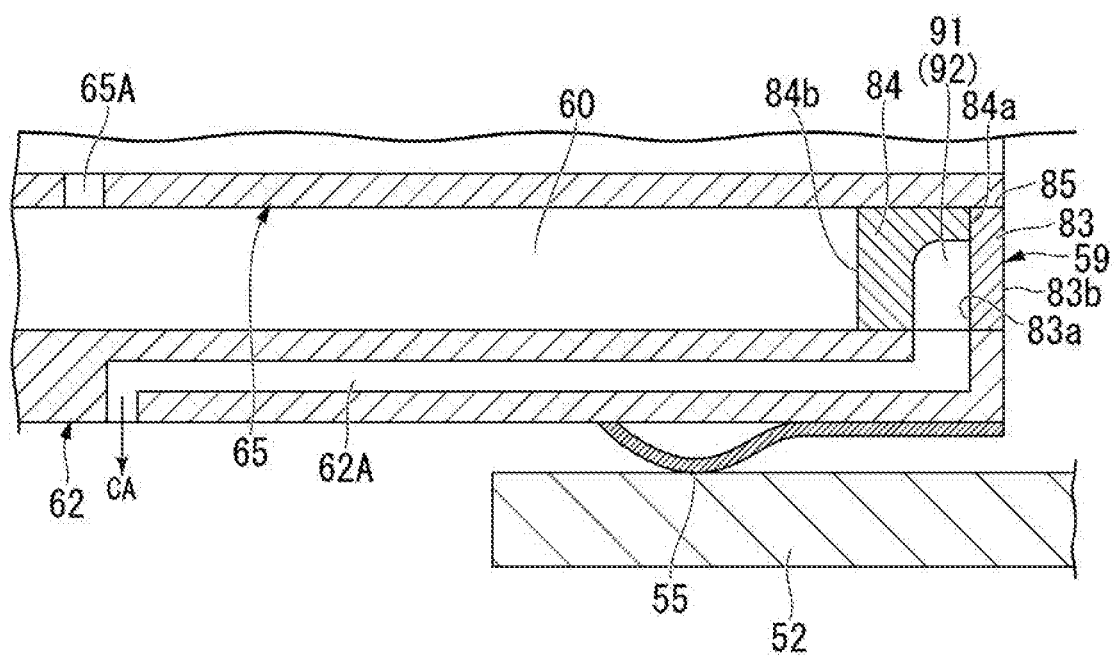
FIG. 6 is an enlarged cross-sectional view of a portion surrounded by an area M shown in FIG. 2.

In FIG. 3, the same components as those of the structure shown in FIG. 2 will be indicated by the same reference numerals. In FIG. 4, the same components as those of the structures shown in FIGS. 2 and 3 will be indicated by the same reference numerals. In FIG. 5, the same components as those of the structures shown in FIGS. 2 and 4 will be indicated by the same reference numerals. In FIG. 6, the same components as those of the structures shown in FIGS. 2 to 4 will be indicated by the same reference numerals.

The combustor 15 includes an outer cylinder 49, a fuel injector 50, a transition piece 52, and a spring member 55.

The outer cylinder 49 is a cylindrical member of which both ends are opening ends. A plurality of the outer cylinders 49 are provided in the middle casing 13 while a part of them are disposed inside the middle casing 13. The plurality of outer cylinders 49 are arranged around the axis Ax at intervals.

The outer cylinder 49 generates a high-temperature and high-pressure combustion gas G by burning a gas (mixed gas) in which the compressed air A and the fuel gas F injected from the fuel injector 50 are mixed.

The turbine casing 33 is connected to the outlet side of the outer cylinder 49. The outer cylinder 49 supplies the generated combustion gas G into the turbine casing 33.

The fuel injector 50 is accommodated in the outer cylinder 49 and includes an upstream plate 58, a downstream plate 59, a cylindrical member 62, a fuel tube 64, a premix tube 65, and a cooling air introduction pipe 68.

The upstream plate 58 includes a plate body 71, a fuel tube insertion hole 73, and a premix tube insertion hole 75.

The plate body 71 is a plate-shaped member and is disposed inside the cylindrical member 62 located on the upstream side. The outer peripheral surface of the plate body 71 is connected to the inner peripheral surface of the cylindrical member 62. As the plate body 71, for example, a circular metallic plate member can be used.

The fuel tube insertion hole 73 is formed so as to penetrate the center portion of the plate body 71 in the X direction. The fuel tube insertion hole 73 is a hole into which a front end portion of the fuel tube 64 is inserted.

A plurality of the premix tube insertion holes 75 are provided in the plate body 71 located outside the fuel tube insertion hole 73. The premix tube insertion hole 75 penetrates the plate body 71 in the X direction. The premix tube insertion hole 75 is a hole into which an upstream end portion of the premix tube 65 is inserted. The compressed air A is introduced while the upstream end portion of the premix tube 65 is introduced into the premix tube insertion hole 75.

The downstream plate 59 is disposed inside the cylindrical member 62 located on the downstream side of the upstream plate 58 and defines the plenum 60 together with the upstream plate 58 and the cylindrical member 62.

The downstream plate 59 includes a first plate portion 83, a second plate portion 84, a premix tube insertion hole 85, an air inlet 86, a distribution portion 88, and a cooling flow path 91.

The first plate portion 83 is a plate-shaped member and is disposed inside the cylindrical member 62 located on the downstream side of the upstream plate 58. The outer peripheral surface of the first plate portion 83 is connected to the inner peripheral surface of the cylindrical member 62.

The first plate portion 83 includes a first surface 83a which faces the upstream plate 58 in the X direction and a surface 83b which is disposed on the side opposite to the first surface 83a.

The surface 83b of the first plate portion 83 is a surface where attached flame may occur. For this reason, the temperature on the side of the surface 83b of the first plate portion 83 tends to be higher than the temperature on the side of the first surface 83a.

As the first plate portion 83, for example, a circular metallic plate member can be used.

The second plate portion 84 is a plate-shaped member and is provided inside the cylindrical member 62 located on the upstream side of the first plate portion 83. The second plate portion 84 is disposed so as to contact the first surface 83*a*. The second plate portion 84 is bonded to the first surface 83*a*.

The second plate portion 84 includes a second surface 84*a* which is bonded to the first surface 83*a* and a surface 84*b* which is disposed on the side opposite to the second surface 84*a*. The surface 84*b* defines an end of the plenum 60 located on the downstream side in the X direction.

As described above, the first plate portion 83 is disposed on the downstream side of the second plate portion 84. For this reason, the temperature of the second plate portion 84 is lower than the temperature of the first plate portion 83.

A plurality of the premix tube insertion holes 85 are formed so as to penetrate the first and second plate portions 83 and 84 in the X direction. Each of the plurality of premix tube insertion holes 85 is disposed at a position facing one premix tube insertion hole 75 disposed in the X direction.

The premix tube insertion hole 85 is a hole into which the downstream end portion of the premix tube 65 is inserted.

The air inlet 86 is a concave portion which is formed in the second plate portion 84 from the side of the second surface 84*a* and is connected to the downstream end portion of the cooling air introduction pipe 68. The air inlet 86 is connected to the distribution portion 88 provided in each sector 90.

With the air inlet 86 having such a configuration, since the plenum for the cooling air does not need to be provided and only the plenum 60 for the fuel gas may be provided, the structure of the fuel injector 50 can be simplified.

The distribution portion 88 is a concave portion which is formed in the second plate portion 84 from the second surface 84*a* and communicates with the plurality of cooling flow paths 91.

The distribution portion 88 has a function of distributing the cooling air CA introduced from the cooling air introduction pipe 68 to the plurality of cooling flow paths 91.

A plurality of the cooling flow paths 91 are formed in the second plate portion 84. As the cooling flow path 91, for example, a groove 92 which is recessed from the second surface 84*a* toward the upstream plate 58 can be used. As can be seen in FIGS. 2 and 4, the cooling flow path 91 is formed so as not to communicate with the plenum 60 via the second plate portion 84.

The cooling air CA which is distributed by the distribution portion 88 flows through the cooling flow path 91. The cooling air CA flowing through the cooling flow path 91 is air for cooling the first and second plate portions 83 and 84. The cooling flow path 91 is disposed so as to extend in a direction along the surface (the first surface 83*a*) of the downstream plate 59 while avoiding the premix tube 65.

Figure 7:
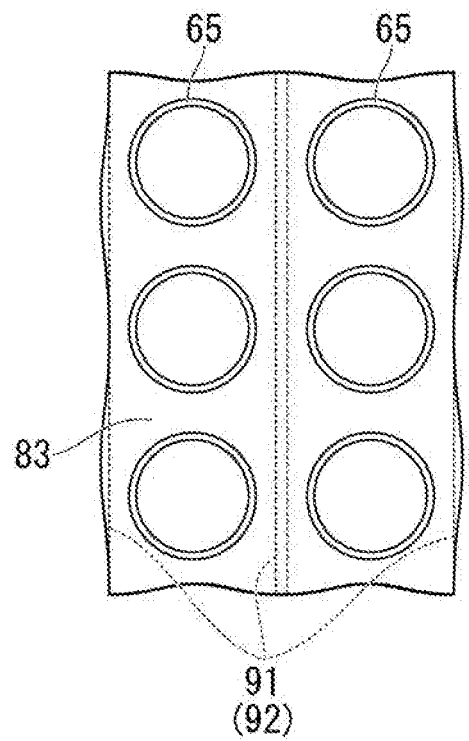
FIG. 7 is a (first) diagram showing another arrangement example of a cooling flow path.
Figure 8:
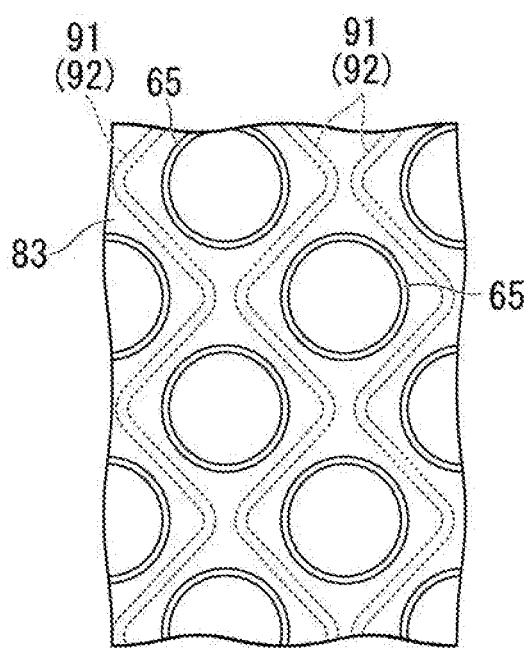
FIG. 8 is a (second) diagram showing another arrangement example of the cooling flow path.

Additionally, in this embodiment, "extending while avoiding the premix tube 65" includes a case in which the cooling flow path 91 is disposed linearly so as to avoid the premix tube 65 or a case in which the cooling flow path 91 is disposed in a zigzag so as to avoid the premix tube 65 as shown in FIGS. 7 and 8.

In FIGS. 7 and 8, the same components as those of the structure shown in FI. 5 will be indicated by the same reference numerals.

In this way, it is possible to directly cool the downstream plate 59 with the cooling air CA by providing the cooling flow path 91 through which the cooling air CA flows in the downstream plate 59 having a high temperature. Accordingly, it is possible to efficiently cool the downstream plate 59 by using a small amount of the cooling air CA compared to a case in which the cooling air CA is blown out from the outside of the downstream plate 59.

Further, since the cooling flow path 91 is formed in the second plate portion 84 disposed on the upstream side of the first plate portion 83 instead of the first plate portion 83 in which attached flame may be formed, it is possible to reduce the thickness of the first plate portion 83 which tends to be hotter than the second plate portion 84.

Accordingly, the first plate portion 83 having a thin thickness can be efficiently cooled by using the cooling air CA flowing through the cooling flow path 91.

Further, since a part of the cooling air CA flowing through the cooling flow path 91 can directly contact the first surface 83*a* of the first plate portion 83 by using the groove 92 recessed from the second surface 84*a* toward the upstream plate 58 as the cooling flow path 91, it is possible to efficiently cool the first plate portion 83 compared to a case in which the cooling flow path 91 is embedded in the second plate portion 84.

The cylindrical member 62 is a cylindrical metallic member of which the upstream side and the downstream side in the X direction are opening ends. The cylindrical member 62 is a member that accommodates the first and second plate portions 83 and 84 and defines the plenum 60 together with the first and second plate portions 83 and 84.

The cylindrical member 62 includes a discharge path 62A which is connected to the cooling flow path 91 formed in the downstream plate 59 and discharges the cooling air CA led out from the cooling flow path 91 to a space inside the outer cylinder formed on the upstream side in relation to the upstream plate 58.

With the discharge path 62A having such a configuration, the cooling air CA discharged from the discharge path 62A can be used again as air introduced into the premix tube 65.

The fuel tube 64 extends in the X direction and is bonded to the upstream plate 58 while the front end portion is inserted into the fuel tube insertion hole 73. The fuel tube 64 supplies the fuel gas to the plenum 60.

The premix tube 65 is a tubular tube of which the upstream side and the downstream side are opening ends. The premix tube 65 is provided so as to perforate the upstream plate 58, the downstream plate 59, and the plenum 60 in the X direction.

The upstream end portion of the premix tube 65 is disposed in the premix tube insertion hole 75 and is bonded to the plate body 71 defining the premix tube insertion hole 75.

The downstream end portion of the premix tube 65 is disposed in the premix tube insertion hole 85 and is bonded to the first and second plate portions 83 and 84 defining the premix tube insertion hole 85.

The premix tube 65 includes a fuel hole 65A which leads the fuel gas F introduced to the plenum 60 into the premix tube 65. The fuel gas F which is introduced from the fuel hole 65A into the premix tube 65 is mixed with the compressed air A inside the premix tube 65.

The cooling air introduction pipe 68 is disposed inside the fuel tube 64 and in the plenum 60 while the downstream end portion is connected to the second plate portion 84. The cooling air introduction pipe 68 introduces the cooling air CA into the air inlet 86.

According to the fuel injector 50 of this embodiment, since the cooling flow path 91 through which the cooling air CA flows is provided in the downstream plate 59 having a high temperature, the downstream plate 59 can be directly cooled with the cooling air CA. Accordingly, it is possible to efficiently cool the downstream plate 59 by using a small amount of the cooling air CA compared to a case in which the cooling air CA is blown out from the outside of the downstream plate 59.

Further, since the downstream plate 59 is provided with the air inlet 86 into which the cooling air CA is introduced from the cooling air introduction pipe 68, the plenum for the cooling air does not need to be provided and only the plenum 60 for the fuel gas may be provided. Accordingly, the structure of the fuel injector 50 can be simplified.

Here, a method of forming the downstream plate 59 and a method of bonding the premix tube 65 to the downstream plate 59 will be described with reference to FIGS. 9 to 12. In FIGS. 9 to 12, the same components as those of the structure shown in FIG. 4 will be indicated by the same reference numerals.

Figure 9:
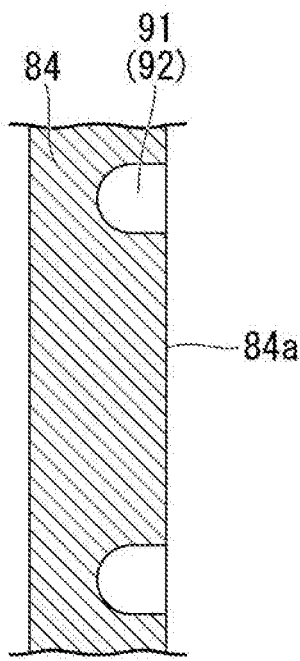
FIG. 9 is a cross-sectional view showing a step of forming the cooling flow path.

First, in the step shown in FIG. 9, the cooling flow path 91 is formed by processing the groove 92 from the side of the second surface 84a of the second plate portion 84.

Figure 10:
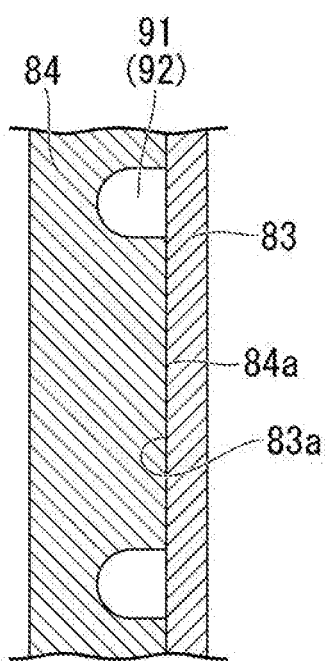
FIG. 10 is a cross-sectional view showing a bonding step of bonding a first plate portion and a second plate portion.

Next, in the step shown in FIG. 10, the second plate portion 84 and the first plate portion 83 are bonded so that the second surface 84a of the second plate portion 84 contacts the first surface 83a of the first plate portion 83. As the bonding method, for example, brazing can be used.

Figure 11:
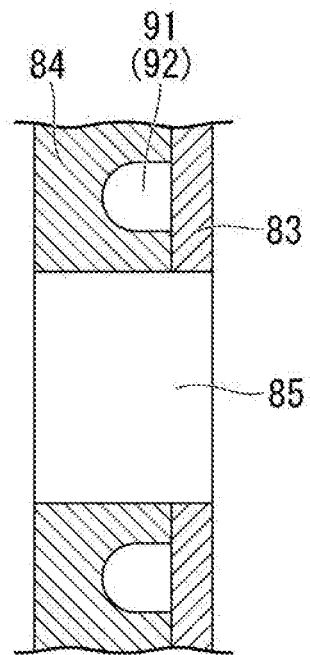
FIG. 11 is a cross-sectional view showing a step of forming a premix tube insertion hole.

Next, in the step shown in FIG. 11, the premix tube insertion hole 85 penetrating the first and second plate portions 83 and 84 is formed.

In addition, although not shown in the drawings, in the step shown in FIG. 1, the air inlet 86 and the distribution portion 88 may be formed together with the premix tube insertion hole 85.

Figure 12:
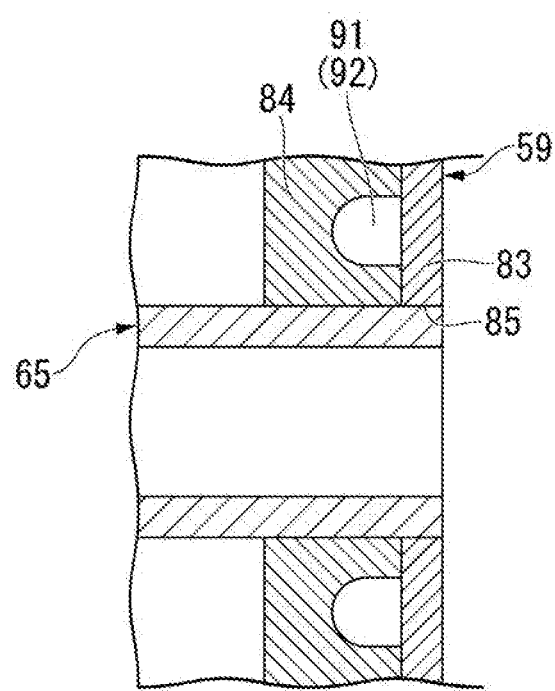
FIG. 12 is a cross-sectional view showing a bonding step of bonding the premix tube to a downstream plate.

Next, in the step shown in FIG. 12, the premix tube 65 is fixed to the downstream plate 59 by welding while the downstream end portion of the premix tube 65 is inserted into the premix tube insertion hole 85.

Next, the transition piece 52 and the spring member 55 will be described with reference to FIG. 2.

The transition piece 52 is a cylindrical member and accommodates the downstream side of the fuel injector 50 with a gap therebetween.

The spring member 55 is disposed between the outer peripheral surface of the fuel injector 50 and the inner peripheral surface of the transition piece 52.

The position of the fuel injector 50 inside the outer cylinder 49 is regulated by the transition piece 52 and the spring member 55.

Next, the cooling device 17 will be described with reference to FIG. 1.

The cooling device 17 is a device that extracts a part of the compressed air A supplied to the combustor 15, compresses the air again, and supplies the air to the fuel injector 50.

The cooling device 17 includes an extraction unit 101, a cooler 103, a forced air-cooled compressor 104, an anti-surge valve 105, and a cooling air introduction line 106.

The extraction unit 101 is provided in the middle casing 13. The extraction unit 101 extracts the compressed air A introduced into the middle casing 13. The extracted compressed air A is supplied to the cooler 103.

The cooler 103 cools the extracted compressed air A. The compressed air A cooled by the cooler 103 is supplied to the forced air-cooled compressor 104.

With the cooler 103 having such a configuration, the compressed air A can be cooled. Accordingly, the cooling air CA having a temperature lower than the extracted compressed air A can be supplied to the combustor 15.

The forced air-cooled compressor 104 generates the cooling air CA by further compressing the compressed air A cooled by the cooler 103. The cooling air CA generated by the forced air-cooled compressor 104 is led to the cooling air introduction line 106.

The anti-surge valve 105 prevents a surge of the forced air-cooled compressor 104.

The cooling air introduction line 106 is connected to the cooling air introduction pipe 68 shown in FIG. 2. The cooling air introduction line 106 introduces the cooling air CA into the cooling air introduction pipe 68.

Additionally, the cooling air CA may be supplied to another cooling target of the gas turbine 10, for example, the stator blade.

Since the above-described cooling device 17 includes the forced air-cooled compressor 104, the compressed air A extracted from the extraction unit 101 can be further compressed. Accordingly, the cooling air CA having a pressure higher than the extracted compressed air A can be supplied to the combustor 15.

Further, since the forced air-cooled compressor 104 is provided, the cross-sectional area of the cooling flow path 91 can be decreased.

Further, in FIG. 2, a case in which the cooling device 17 having one system is provided in one gas turbine 10 has been described as an example, but the cooling device 17 having a plurality of systems may be provided in one gas turbine 10.

According to the gas turbine 10 of this embodiment described above, since the combustor 15 is provided, the downstream plate 59 can be efficiently cooled and the gas turbine 10 can be stably operated.

Figure 13:
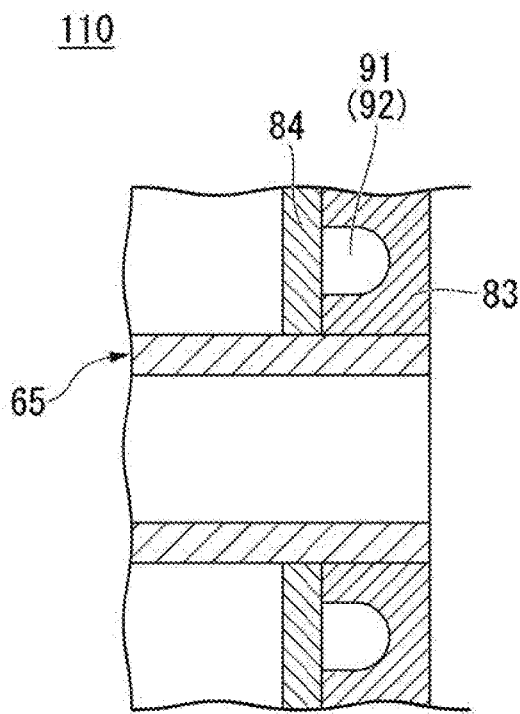
FIG. 13 is a cross-sectional view showing a main part of a fuel injector according to a first modified example of this embodiment.

Next, a fuel injector 110 according to a first modified example of this embodiment will be described with reference to FIG. 13. FIG. 13 shows a part of the fuel injector 110 in an enlarged state. In FIG. 13, the same components as those of the structure shown in FIG. 12 will be denoted by the same reference numerals.

The fuel injector 110 has the same configuration as that of the fuel injector 50 of this embodiment except that the thickness of the first plate portion 83 is thicker than that of the second plate portion 84 and the first place portion 83 is provided with the cooling flow path 91 (the groove 92). In this way, the first plate portion 83 may be provided with the cooling flow path 91 (the groove 92).

Figure 14:
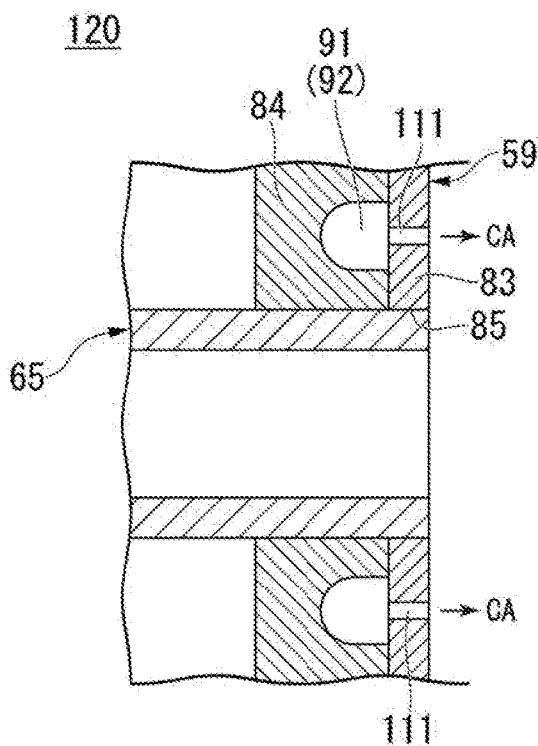
FIG. 14 is a cross-sectional view showing a main part of a fuel injector according to a second modified example of this embodiment.

Next, a fuel injector 120 according to a second modified example of this embodiment will be described with reference to FIG. 14. FIG. 14 shows a part of the fuel injector 120 in an enlarged state. In FIG. 14, the same components as those of the structure shown in FIG. 12 will be denoted by the same reference numerals.

The fuel injector 120 has the same configuration as that of the fuel injector 50 of this embodiment except that a through-hole 111 penetrating a portion facing the groove 92 in the first plate portion 83 is provided.

With the through-hole 111 having such a configuration, the first plate portion 83 can be cooled from the inside of the first plate portion 83 by the cooling air CA flowing through the through-hole 111 and the surface 83b of the first plate portion 83 can be cooled by the cooling air CA ejected from the through-hole 111. Accordingly, the first plate portion 83 can be cooled very efficiently.

Although preferred embodiments of the present invention have been described above, the present invention is not limited to the specific embodiments and can be modified and changed in various forms without departing from the spirit of the present invention described in the claims.

Additionally, in the above-described embodiment, a case in which the compressed air A compressed by the compressor 11 passes through the cooling device 17 and is supplied to the fuel injectors 50, 110, and 120 as the cooling air CA has been described as an example, but the compressed air A compressed by the compressor 11 may be supplied to the fuel injectors 50, 110, and 120 as the cooling air CA without passing through the cooling device 17.

INDUSTRIAL APPLICABILITY

The present invention can be applied to a fuel injector, a combustor, and a gas turbine.

REFERENCE SIGNS LIST

5 Generator
10 Gas turbine
11 Compressor
12 Turbine
13 Middle casing
15 Combustor
17 Cooling device
21 Compressor rotor
23 Compressor casing
25 Compressor vane row
27 Compressor rotor shaft
28 Compressor blade row
31 Turbine rotor
33 Turbine casing
35 Turbine vane row
37 Turbine rotor shaft
38 Turbine blade row
42 Gas turbine rotor
49 Outer cylinder
50, 110, 120 Fuel injector
52 Transition piece
55 Spring member
58 Upstream plate
59 Downstream plate
60 Plenum
62 Cylindrical member
62A Discharge path
64 Fuel tube
65 Premix tube
68 Cooling air introduction pipe
71 Plate body
73 Fuel tube insertion hole
75, 85 Premix tube insertion hole
83 First plate portion
83a First surface
83b, 84b Surface
84 Second plate portion
84a Second surface
86 Air inlet
88 Distribution portion
90 Sector
91 Cooling flow path
92 Groove
101 Extraction unit
103 Cooler
104 Forced air-cooled compressor
105 Anti surge valve
106 Cooling air introduction line
111 Through-hole
A Compressed air
Ao Outside air
Ax Axis
CA Cooling air
P Fuel gas
G Combustion gas
I, J, M Area
L Center axis

The invention claimed is:

1. A fuel injector comprising:
an upstream plate;
a downstream plate installed at a downstream side of the upstream plate and disposed so as to face the upstream plate;
a cylindrical member formed like a cylinder having upstream and downstream opening ends, and in which a plenum is defined by the upstream plate disposed at the upstream opening end of the cylindrical member and the downstream plate disposed at the downstream opening end of the cylindrical member;
a fuel tube configured to introduce a fuel gas into the plenum;
a premix tube formed like a tube having upstream and downstream opening ends and extending so as to pass through the upstream plate and the downstream plate and the plenum, and having a fuel hole for introducing the fuel gas supplied into the plenum, the fuel gas being mixed with air introduced from the upstream opening end of the premix tube; and
a cooling air introduction pipe configured to introduce cooling air into the downstream plate,
wherein the downstream plate includes:
an air inlet into which the cooling air is introduced from the cooling air introduction pipe;
a cooling flow path extending in a direction along a surface of the downstream plate from the air inlet so as to avoid the premix tube;
a first plate portion having a first surface facing the upstream plate; and
a second plate portion on an upstream side of the first plate portion, the second plate portion including a second surface bonded to the first surface, and the second plate portion including the cooling flow path;
wherein the cooling flow path is formed as a groove recessed from the second surface toward the upstream plate side, and
wherein the cooling flow path is configured to avoid communicating with the plenum via the second plate portion.

2. The fuel injector according to claim 1, wherein the first plate portion includes a through-hole passing through a portion facing the groove.

3. The fuel injector according to claim 1, wherein the cylindrical member includes a discharge path through which the cooling air, which has passed through the downstream plate, is discharged toward an upstream side in relation to the upstream plate.

4. A combustor comprising:
the fuel injector according to claim 1; and
a transition piece in which the fuel injector is accommodated, the transition piece being configured to generate a combustion gas by burning a gas in which air is mixed with a fuel gas injected from the fuel injector.

5. A gas turbine comprising:
the combustor according to claim 4;
a compressor configured to generate compressed air and supply the compressed air to the fuel injector;
an extraction unit configured to extract the compressed air generated by the compressor;
a forced air-cooled compressor configured to further compress the compressed air extracted by the extraction unit and generates cooling air; and a cooling air introduction line configured to introduce the cooling air generated by the forced air-cooled compressor to the combustor.

6. The gas turbine according to claim 5, further comprising:
a cooler configured to cool the compressed air extracted by the extraction unit.

* * * * *